(12) United States Patent
Kim et al.

(10) Patent No.: US 7,756,961 B2
(45) Date of Patent: Jul. 13, 2010

(54) HARDWARE DEVICE AND METHOD FOR CREATION AND MANAGEMENT OF TOE-BASED SOCKET INFORMATION

(75) Inventors: Sun-Wook Kim, Gyeonggi-do (KR); ChanHo Park, Daejon (KR); Kyoung Park, Daejon (KR); Myung-Joon Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1252 days.

(21) Appl. No.: 11/297,127

(22) Filed: Dec. 7, 2005

(65) Prior Publication Data

US 2006/0123123 A1   Jun. 8, 2006

(30) Foreign Application Priority Data

Dec. 8, 2004   (KR) .................... 10-2004-0102909
Sep. 27, 2005   (KR) .................... 10-2005-0090066

(51) Int. Cl.
*G06F 15/173* (2006.01)

(52) U.S. Cl. .................. 709/223; 709/250; 709/227; 709/228; 370/229; 370/352; 719/312; 719/313

(58) Field of Classification Search ................ 709/227, 709/228, 223; 370/229, 352; 719/312, 313
See application file for complete search history.

(56) References Cited

U.S. PATENT DOCUMENTS

| | | | | |
|---|---|---|---|---|
| 5,684,979 | A * | 11/1997 | Grimes .................... | 711/170 |
| 6,247,173 | B1 * | 6/2001 | Subrahmanyam ........... | 717/160 |
| 6,334,153 | B2 * | 12/2001 | Boucher et al. ............ | 709/230 |
| 6,591,302 | B2 * | 7/2003 | Boucher et al. ............ | 709/230 |
| 6,859,836 | B2 * | 2/2005 | Alibakhsh et al. .......... | 709/227 |
| 6,954,797 | B1 * | 10/2005 | Takeda et al. .............. | 709/236 |
| 6,996,070 | B2 * | 2/2006 | Starr et al. ................ | 370/252 |
| 7,206,864 | B2 * | 4/2007 | Enko et al. ................ | 709/249 |
| 7,287,077 | B2 * | 10/2007 | Haugh et al. .............. | 709/225 |
| 7,613,813 | B2 * | 11/2009 | Hussain et al. ............. | 709/227 |
| 2002/0085555 | A1 * | 7/2002 | Jung ........................ | 370/389 |

(Continued)

OTHER PUBLICATIONS

Freimuth Doug, Hu Elbert, LaVoie Jason, Mraz Ronald, Nahum Erich, Pradhan Prashant, John Tracey, "Server Network Scalability and TCP Offload", 2005, pp. 4-7.*

*Primary Examiner*—John Follansbee
*Assistant Examiner*—Anthony Mejia
(74) *Attorney, Agent, or Firm*—Blakely, Sokoloff, Taylor & Zafman LLP

(57) ABSTRACT

Provided are a hardware device and a method for creating and managing socket information serving as a connection with a network protocol hierarchy in a network application program. The hardware device includes a TCP transmission processor for processing commands on requests for creating and eliminating a socket of a predetermined network program in response to the requests for creating and eliminating a socket, a TCP reception processor for creating a search signal for a corresponding socket identification when a new packet is received, a socket management unit for creating and eliminating a socket ID upon a command from the TCP transmission processor, and searching the socket ID and providing the socket ID to the TCP transmission processor upon a command from the TCP reception processor, and a memory unit for storing the socket information, and providing the socket information to the TCP reception processor.

24 Claims, 9 Drawing Sheets

U.S. PATENT DOCUMENTS

| | | | |
|---|---|---|---|
| 2003/0135578 A1* | 7/2003 | Banga et al. | 709/215 |
| 2004/0246974 A1* | 12/2004 | Gyugyi et al. | 370/395.31 |
| 2004/0249957 A1* | 12/2004 | Ekis et al. | 709/228 |
| 2005/0135361 A1* | 6/2005 | Lim et al. | 370/389 |
| 2005/0182841 A1* | 8/2005 | Sharp | 709/228 |
| 2005/0190787 A1* | 9/2005 | Kuik et al. | 370/466 |
| 2005/0246450 A1* | 11/2005 | Enko et al. | 709/230 |
| 2006/0168281 A1* | 7/2006 | Starr et al. | 709/230 |
| 2006/0212587 A1* | 9/2006 | Barsuk | 709/228 |

* cited by examiner

HARDWARE DEVICE AND METHOD FOR CREATION AND MANAGEMENT OF TOE-BASED SOCKET INFORMATION

FIELD OF THE INVENTION

The present invention relates to a hardware device and a method for creating and managing socket information serving as a connection with a network protocol hierarchy in a network application program. The hardware device is Transmission Control Protocol (TCP) Offload Engine (TOE) that has an exclusive hardware logic to accelerate TCP processing.

DESCRIPTION OF RELATED ART

Creation and management of socket information necessitate considerable labor efforts as the number of sockets for using a protocol hierarchy increases due to execution of a plurality of network application programs in a computer system. In TOE that uses a hardware engine for acceleration of protocol, a firmware or a hardware device is required for creating and managing socket information. The present invention discloses a method for rapidly and effectively creating and managing socket information on hardware in designing TOE.

Typically, server-client relationship is established between systems interconnected via a network. A plurality of clients may be connected to a server that acts as a processor for receiving requests from the clients and processing such requests in an independent system. A client serves as a processor that requests a server to handle any work in an independent system. A program such as a network program is used for mutual communication between a server and a client. Such a network program is used for transmitting/receiving data over a network through a socket serving as a communication node provided by software.

In a conventional network program, creation and management of a socket are carried out by software at a network protocol stack on an operating system. Sockets are created by every connection or link activated by server and client processors in a system. The number of sockets to be created and managed at a protocol stack in an operating system increases as each processor increases. This causes a considerable load for processing a network protocol in a system, thereby degrading overall performance of the system.

SUMMARY OF THE INVENTION

It is, therefore, an object of the present invention to provide an exclusive hardware device and its driving method for creation and management of a socket for a connection activated by server and client processors in TOE for an acceleration of TCP.

Specifically, the object of the invention is to reduce a system overhead caused by the creation and management of sockets as the increase of connections activated by server and client processes in a system. It is possible that the exclusive hardware device in TOE creates and manages sockets processed by the software such as network protocol stack in the Operating System (OS).

In accordance with the present invention, there is provided a hardware device for creation and management of socket information, the hardware device including: a Transmission Control Protocol (TCP) transmission processor for processing commands on requests for creation and elimination of a socket of a predetermined network program in response to the requests for creation and elimination of a socket; a TCP reception processor for creating a search signal for a corresponding socket identification (ID) when a new packet is received; a socket management unit for creating and eliminating a socket ID in accordance with a command from the TCP transmission processor, and searching the socket ID and providing the searched socket ID to the TCP transmission processor in accordance with a command from the TCP reception processor; and a memory unit for storing the socket information under the control of the TCP transmission processor, and providing the socket information to the TCP reception processor.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, a preferred embodiment of the present invention will be described in detail referring to the accompanying drawings. In the following description, well-known functions or constructions will not be described in detail if it seems that they could obscure the invention in unnecessary detail.

Figure 1:
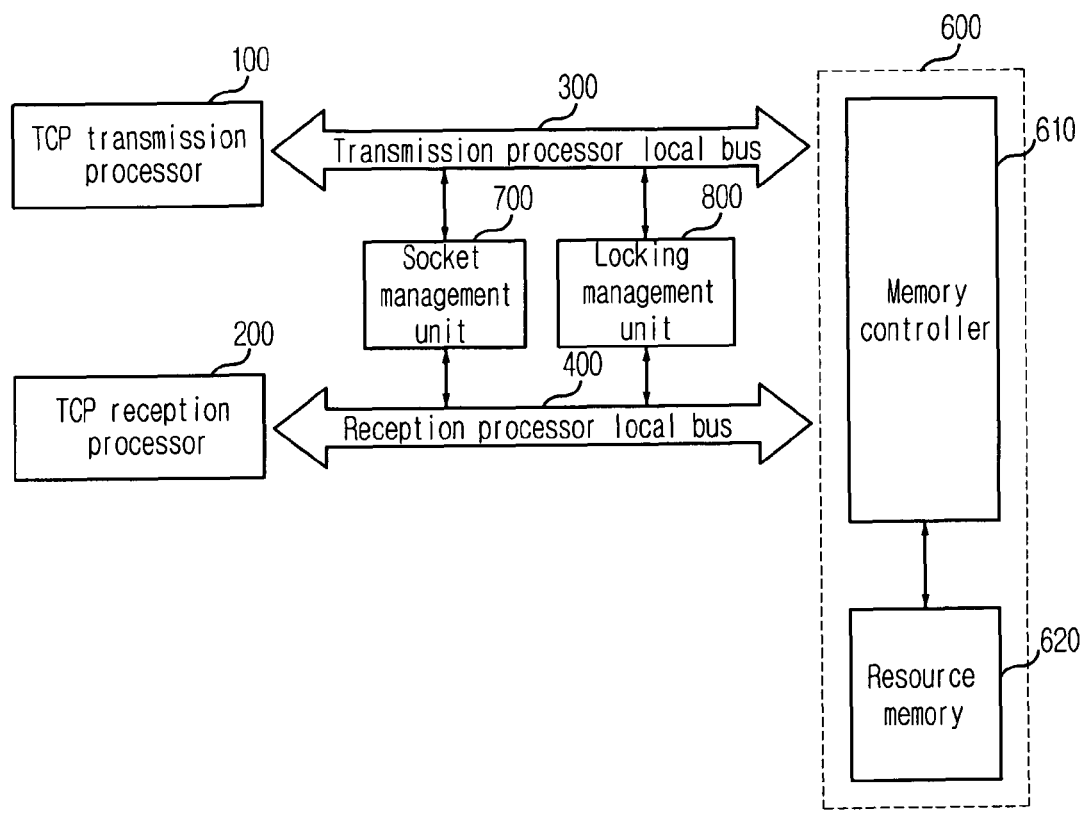
FIG. 1 shows a hardware device for creation and management of a socket in accordance with an embodiment of the present invention in an entire hardware device of TOE for acceleration of a protocol.

FIG. 1 shows a hardware device for creation and management of a socket in accordance with an embodiment of the present invention in an entire hardware device of TOE for acceleration of a protocol.

The hardware device shown in FIG. 1 is used in a case where a TCP protocol is processed by a transmission processor and a reception processor, and in a case where a transmission processor performs creation and elimination of a socket, a reception processor only makes a request for search, and socket information is stored in an internal memory of the hardware device.

Referring to FIG. 1, the hardware device includes a TCP transmission processor 100 for receiving a request for creation and elimination of a socket in a predetermined network program and processing a command on creation and elimination of a socket, a TCP reception processor 200 for generating a search signal for a relevant socket ID when a new packet is received, a socket management unit 700 for creating and eliminating a socket ID in accordance with a command from the TCP transmission processor, searching a socket ID in accordance with a command from the TCP reception processor, and providing the TCP transmission processor with the searched socket ID, and a memory unit 600 for storing socket information under the control of the TCP transmission processor, and providing the TCP reception processor with the socket information.

The socket management unit 700 is connected to the TCP transmission processor 100 via a transmission processor local bus 300, and to the TCP reception processor 200 via a reception processor local bus 400.

As shown in FIG. 1, the memory unit 600 is connected to the TCP transmission processor 100 and the socket management unit 700 through the transmission processor local bus 300, and to the TCP reception processor 200 and the socket management unit 700 through the reception processor local bus 400. Further, the memory unit 600 includes a resource memory 620 for storing socket information and a memory controller 610 for controlling the resource memory 620 under the control of the TCP transmission processor 100 or the TCP reception processor 200.

Furthermore, as shown in FIG. 1, the hardware device further includes a locking management unit 800 for controlling a simultaneous access of the TCP transmission processor 100 and the TCP reception processor 200 to a same socket. The locking management unit 800 is connected to the TCP transmission processor 100 through the transmission processor local bus 300 and to the TCP reception processor 200 through the reception processor local bus 400, as shown in FIG. 1.

The term "socket information" used herein implies attributes for constituting a socket and using it. For example, socket information includes a destination Internet Protocol (IP) address, a source IP address, a socket type, and port numbers of the socket itself and destination.

Creation and management of a socket can be divided into five operations. A first operation is conducted when the TCP transmission processor 100 makes a request for creation of a socket in response to a request by a network program. A second operation is carried out when a request for elimination of a socket is made. A third operation is made when a wait of a socket by a server network program is requested. A fourth operation is performed when all of information for constituting a socket is collected. Finally, a fifth operation is conducted when the TCP reception processor makes a request for search of a socket. The first to fourth operations are carried out when the TCP transmission processor 100 issues a command to a transmission command register 710 of the socket management unit 700; and the last operation is performed when the TCP reception processor 200 issues a command to a reception command register 720 of the socket management unit 700.

Hereinafter, creation and management of a socket will be explained in more detail with reference to the attached drawings.

Figure 2:
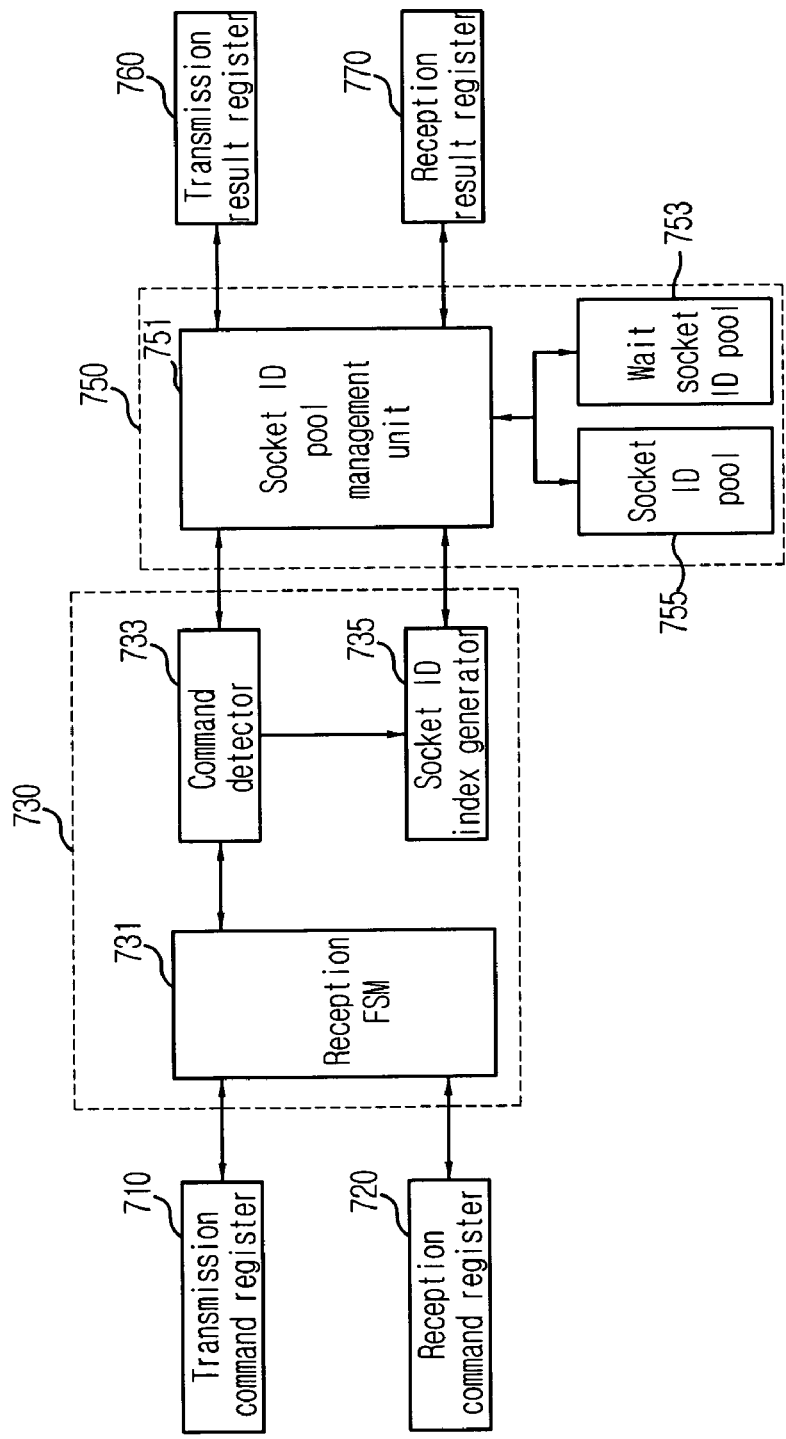
FIG. 2 is a detailed block diagram of the socket management unit depicted in FIG. 1.

FIG. 2 shows a detailed block diagram of the socket management unit 700 depicted in FIG. 1.

Referring to FIG. 2, the socket management unit 700 includes a transmission command register 710 for receiving a predetermined command from the TCP transmission processor 100, a reception command register 720 for receiving a predetermined command from the TCP reception processor 200, a command judging unit 730 for checking commands received at the transmission command register 710 and the reception command register 720, and judging the contents of the commands, a socket ID management unit 750 for storing at least one of a socket ID, a destination IP address, a source port, and a destination port, and managing the socket ID in accordance with the command judged by the command judging unit 730, a transmission result register 760 connected to the TCP transmission processor 100 for storing the process result of the socket ID management unit 750, and a reception result register 770 connected to the TCP reception processor 200 for storing the result of the processing of the socket ID management unit 750.

The command judging unit 730 includes a reception Finite State Machine (FSM) 731 for checking whether a command is received by checking the transmission command register 710 and the reception command register 720, a command detector 733 for receiving values stored in the transmission command register 710 or the reception command register 720 through the reception FSM 731, and interpreting the content of the command, and a socket ID index generator 735 for generating an index for searching a socket ID, if the content of the command is for searching a socket ID, as described later.

The socket ID management unit 750 includes a socket ID pool 755 for storing information on a socket ID, a destination IP address, a source port, and a destination port, a wait socket ID pool 753 for storing a socket ID of a relevant socket and a source port in a case where a wait request is sent from an external system, and a socket ID pool management unit 751 for controlling the socket ID pool 755 or the wait socket ID pool 753 in accordance with the command judged by the command judging unit 730.

Figure 3:
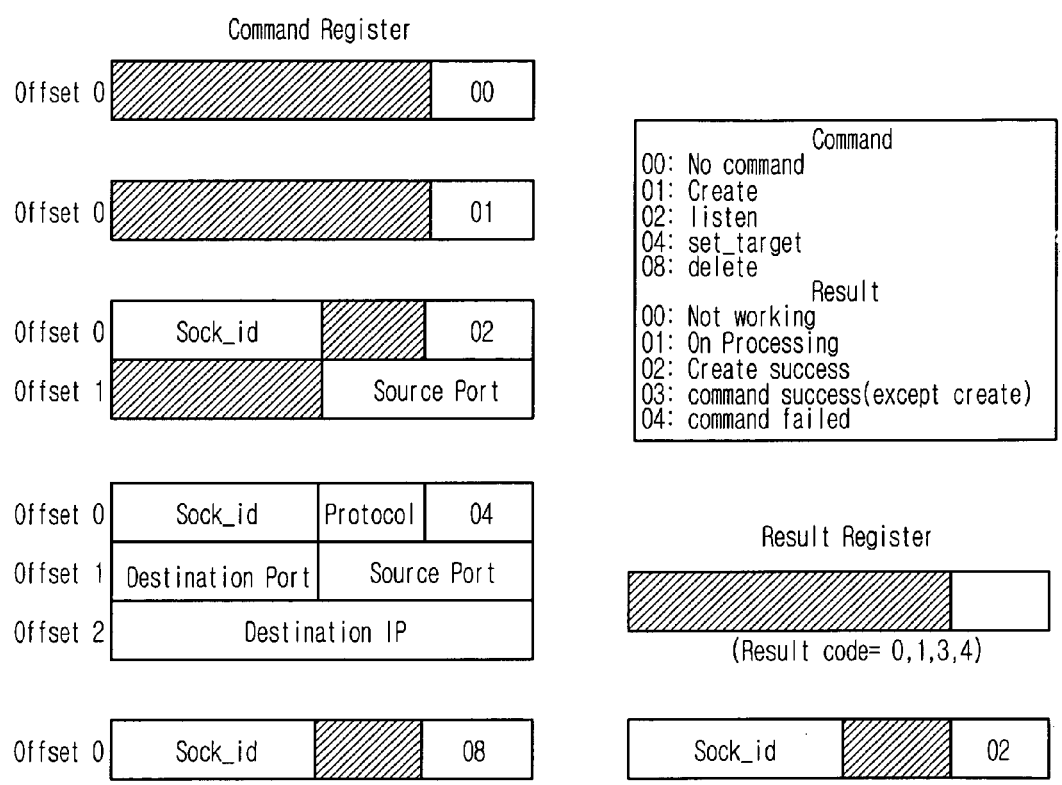
FIG. 3 presents formats of the transmission command register and the transmission result register shown in FIG. 2.
Figure 4:
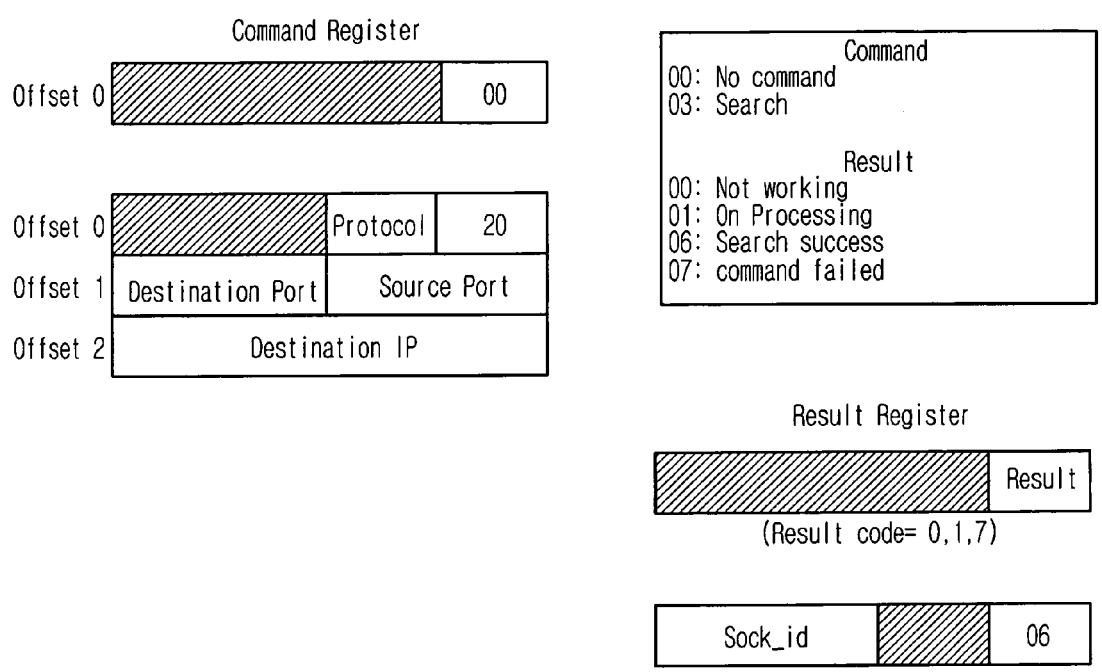
FIG. 4 offers formats of the reception command register and the reception result register depicted in FIG. 2.

FIG. 3 presents formats of the transmission command register 710 and the transmission result register 760 shown in FIG. 2, and FIG. 4 offers formats of the reception command register 720 and the reception result register 770 depicted in FIG. 2.

<Creation of Socket>

When a socket creation command is received from the TCP transmission processor 100, the socket management unit 700 creates a new socket ID with reference to stored existing socket IDs, and creates a socket ID creation success mark.

To be more specific, the TCP transmission processor 100 receives a request for creation of a socket from a predetermined network program. Upon receipt of the request for creation of a socket, the TCP transmission processor 100 issues a command to a command field of the transmission command register 710 by using code '01', as shown in FIG. 3. A protocol field is classified into code '00000110' indicating a connection-oriented protocol TCP and code '00010001' indicating a nonconnection-oriented protocol UDP. Then, the reception FSM 731 checks the transmission command register 710 and the reception command register 720, and transmits values of the transmission command register 710 or the reception command register 720 where the command is stored, to the command detector 733. Subsequently, the command detector 733 interprets the received command; and, if the command is for creation of a socket, makes a request for creation of a new socket ID to the socket ID pool management unit 751 that manages the socket ID pool 755 where information including a socket ID, a destination IP address, a source port, and a destination port are stored. The socket ID pool management unit 751, which has received the request for creation of a socket ID, creates a socket ID with reference to the state of the socket ID pool 755. Here, the socket ID may be sequentially created or created in a method for assigning an arbitrary available ID to the corresponding socket.

The created socket ID is stored in a socket ID field of the transmission result register 760, and code '02' indicating a creation success is marked in a result field. Then, the TCP transmission processor 100 checks the transmission command register 710, calculates an address to be stored in the resource memory 620 of the memory unit 600 on the basis of the relevant socket ID, and stores socket information in a corresponding region. Here, a variety of methods may be used for calculating addresses to be stored in a memory on the basis of a socket ID. For example, a method is possible, in which a value obtained by multiplying a socket ID by the size of a socket is determined as an address to be stored.

<Elimination of Socket>

When a socket elimination command is received from the TCP transmission processor 100, the socket management unit 700 eliminates a relevant socket ID from the stored socket IDs and then produces a socket ID elimination success mark.

More specifically, when a request for socket elimination is received from a network program, the TCP transmission processor 100 first issues a command to a command field of the transmission command register 710 by using '08', as shown in FIG. 3. Then, the TCP transmission processor 100 records ID of the relevant socket in a socket ID field. Subsequently, the reception FSM 731 checks the transmission command register 710 and the reception command register 720, and transmits values of the transmission command register 710 or the reception command register 720 where the command is stored, to the command detector 733. And then, the command detector 733 interprets the relevant command, and makes a request for elimination of the relevant socket ID to the socket ID pool management unit 751 if the command is for elimination of the socket. The socket ID pool management unit 751 which has received the request for elimination of the socket ID resets field values of the relevant socket ID, and marks code '03' indicating a command success in a result field of the transmission result register 760. The TCP transmission processor 100 checks whether the command has succeeded or failed by checking the transmission result register 760.

<Waiting of Socket>

In case where the TCP transmission processor 100 waits for a connection request from an external system, the TCP transmission processor 100 transmits a wait command of a socket to the socket management unit 700, and the socket management unit 700 stores a relevant socket ID and a source port in the socket ID management unit 750 and then creates a wait command success mark.

Specifically, in case where a server processor) waits for a connection request from a client processor on a system connected over a network after a creation of a socket, the server processor makes a request for wait of a socket.

First of all, when a socket wait is received from a predetermined server processor, the TCP transmission processor 100 issues a command to a command field of the transmission command register 710 by using code '02', as shown in FIG. 3. The TCP transmission processor 100 records ID of the relevant socket in a socket ID field and information on the server processor in a source port field.

And then, the reception FSM 731 checks the transmission command register 710 and the reception command register 720, and transmits values of the register where the command is stored, to the command detector 733. Subsequently, the command detector 733 interprets the relevant command, and makes a request for wait of the relevant socket to the socket ID management unit 751 which manages the wait socket ID pool 753 where information on a socket ID and a source port is stored, if the command is for wait of the socket. The socket ID management unit 751, which has received the request for wait of the socket, stores the socket ID and the source port in the wait socket ID pool 753, and marks code '03' indicating a wait command success in a result field of the transmission result register 760. The TCP transmission processor 100 checks whether the command has succeeded or failed by checking the transmission result register 760.

In the socket wait stage, when a request for connection to the wait socket is received from a host on a network, the TCP reception processor 200 informs the TCP transmission processor 100 of the received information. Then, the TCP transmission processor 200 updates the socket information on the basis of the related information, and transmits a packet for connection establishment to a corresponding client host, as described later. Namely, in the stage of receiving a connection request after creation of a socket, as described below, the TCP transmission processor 100 makes use of information on a socket ID and a source port stored in the wait socket ID pool 753.

<Reception of Connection Request after Creation of Socket>

When a connection request is received from an external system after creation of a socket, the TCP transmission processor 100 transmits a socket information success command to the socket management unit 700, and the socket management unit 700 stores the socket information in the socket ID management unit 750 and then creates a socket information success command success mark.

In other words, when a server process has received a connection request from a client process on a system connected to a network after creation of a socket, the server process contains all information constituting a socket. Also, when a connection command is transmitted to a server process on a system connected to a network from a client processor after creation of a socket, the server processor includes all information constituting a socket. During this process, related information stored in the socket ID pool 755 should be updated. Based on the updated information, the TCP transmission processor 100 may search a socket ID using the packet received from a system connected on a network. This will be explained in more detail, as follows.

At first, when a socket information completion request is received from a server processor or a client processor, the TCP transmission processor 100 issues a command to a command field of the transmission command register 710 by using code '04', as shown in FIG. 3. And, the TCP transmission processor 100 records ID of the relevant socket in a socket ID field. A protocol field is classified into code '00000110' indicating a connection-oriented protocol TCP and code '00010001' indicating a nonconnection-oriented protocol UDP. The TCP transmission processor 100 records a destination IP field indicating a destination IP address, a source port field indicating a transmission process, and a destination port field indicating a reception process.

Then, the reception FSM 731 checks the transmission command register 710 and the reception command register 720, and transmits values of the register where the command is stored, to the command detector 733. Subsequently, the command detector 733 interprets the command; and if the command is for success of socket information, it transmits relevant information to the socket ID pool management unit 751 and then makes a request for success of the socket information. The socket ID pool management unit 751, which has received a request for completion of the socket information, stores the related information in the socket ID pool 755, and marks a result field of the transmission result register 760 with code '03' indicating success of a socket information completion command. The TCP transmission processor 100 checks whether the command has succeeded or failed by checking the transmission result register 760.

<Search of Socket>

When a new packet is received from an external system, the TCP reception processor 100 transmits a socket ID search command to the socket management unit 700; and the socket management unit 700 creates an index for search of a socket ID, searches a relevant socket ID by using the index, and then creates a socket ID search command success mark. This will be explained below in more detail.

Specifically, when the TCP reception processor 200 has received a new packet from a system connected to a network, it has to search ID of a relevant socket. First, the TCP reception processor 200 issues a command to a command field of the reception command register 720 by using code '03'. A protocol field is classified into code '00000110' indicating a connection-oriented protocol TCP and code '00010001' indicating a nonconnection-oriented protocol UDP. A destination IP field indicating a destination IP address, a source port field indicating a transmission processor, and a destination port field indicating a reception processor use information stored in a header of the received packet.

Subsequently, the reception FSM 731 checks the transmission command register 710 and the reception command register 720, and transmits values of the register where the command is stored, to the command detector 733. Then, the command detector 733 interprets the relevant command, and, if the command is for search of a socket ID, transmits corresponding information to the socket ID index generator 735 for generating an index for searching a socket ID and the socket ID pool management unit 751. Here, in case where a packet is received, information for searching a corresponding socket ID includes a destination IP address, a source port, and a destination port.

A general hashing table technique may be used for generating an index for search of a socket ID.

The index created by the socket ID index generator 735 is transmitted to the socket ID pool management unit 751, and the socket ID pool management unit 751 searches a socket ID in the socket ID pool 755 on the basis of the index and information transmitted from the command detector 733. The socket ID pool management unit 751 stores the searched socket ID in a socket ID field of the reception result register 770, and marks a result field with code '06' indicating a socket ID search success. The TCP reception processor 200 calculates an address to be read from the resource memory 620 on the basis of the socket ID stored in the reception result register 770, and takes socket information from the resource memory 620. Here, a method for calculating the address to be read from the resource memory 620 is the same as that used in creating a socket, as described above.

<Simultaneous Access Control>

Figure 5:
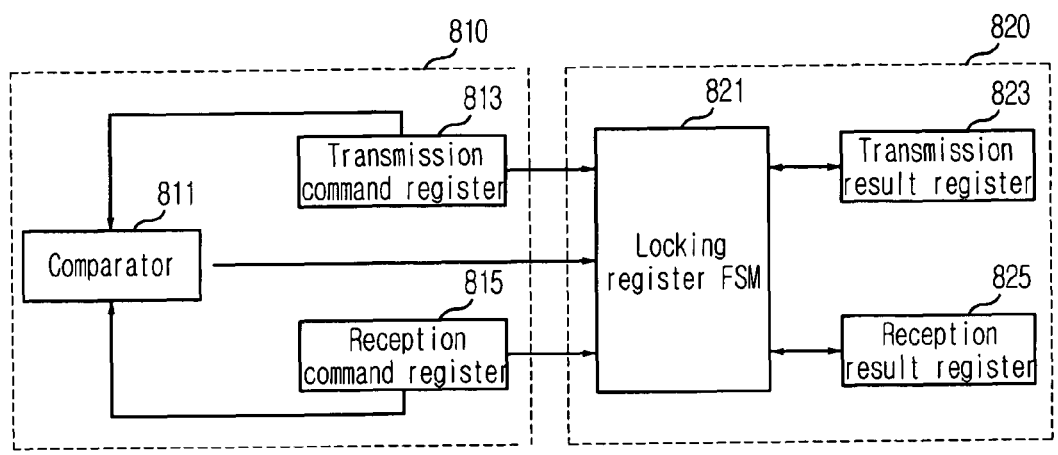
FIG. 5 provides a detailed block diagram of the locking management unit depicted in FIG. 1.

FIG. 5 illustrates a detailed block diagram of the locking management unit 800 depicted in FIG. 1.

The locking management unit 800 serves to prevent data from being modified by other processors while the TCP transmission processor 100 or the TCP reception processor 200 is writing or reading identical socket information at the same time.

Referring to FIG. 5, the locking management unit 800 includes a socket ID comparing section 810 for receiving socket IDs to be used in the TCP transmission processor 100 and the TCP reception processor 200, and comparing the socket IDs, and a simultaneous access control section 820 for informing each processor of whether use of one of processors has been finished if the compared socket IDs are the same, and informing the TCP transmission processor 100 and the TCP reception processor 200 of whether or not the socket IDs are usable if the compared socket IDs are not the same.

The socket ID comparing section 810 includes a transmission command register 813 for receiving and storing a socket ID to be used in the TCP transmission processor 100, a reception command register 815 for receiving and storing a socket ID to be used in the TCP reception processor 200, and a comparator 811 for judging whether or not the socket ID stored in the transmission command register 813 and the socket ID stored in the reception command register 815 are the same.

The simultaneous access control section 820 includes a locking register FSM 821 for judging whether or not use of one of processors has been finished if the socket IDs are the same by the comparator 811, and judging whether or not the socket IDs are usable if the socket IDs are not the same, a transmission result register 823 for storing information on whether or not a socket ID to be used in the TCP transmission processor 100 is usable, in accordance with the judgment of the locking register FSM 821, and a reception result register 825 for storing information on whether or not a socket ID to be used in the TCP reception processor 200 is usable, in accordance with the judgment of the locking register FSM 821.

Figure 6:
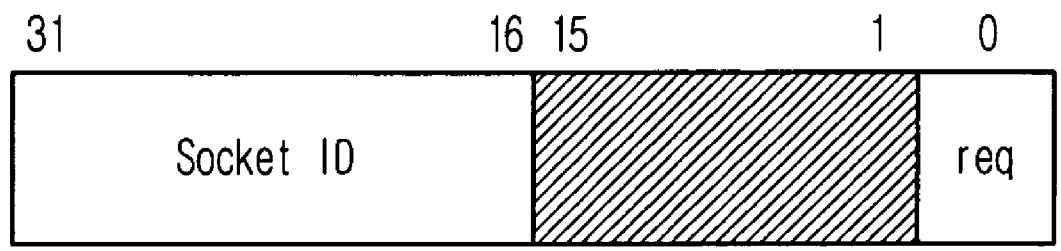
FIG. 6 describes a format of the command register for the transmission command register and the reception command register shown in FIG. 5.
Figure 7:
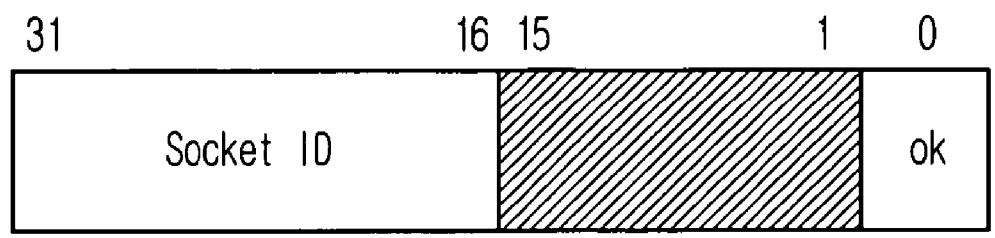
FIG. 7 shows a format of the result register for the transmission result register and the reception result register depicted in FIG. 5.

FIG. 6 shows a format of the command register for the transmission command register 813 and the reception command register 815 depicted in FIG. 5, and FIG. 7 describes a format of the result register for the transmission result register 823 and the reception result register 825 depicted in FIG. 5.

Now, simultaneous access control will be explained in detail with reference to FIGS. 5 to 7.

The TCP transmission processor 100 or the TCP reception processor 200 stores a relevant socket ID in socket ID fields and marks code '1' in request fields of the transmission command register 813 and the reception command register 815 so as to read or write information of a specific socket. Then, the comparator 811 compares socket IDs, and transmits the result of the comparison to the locking register FSM 821. In case where a request for use of the socket ID which has already been used in other processors is received from one of the TCP transmission processor 100 and the TCP reception processor 200 makes, when the processor using the socket ID changes the request fields of the transmission command register 813 or the reception command register 815 to code '0' after completion of use, the locking register FSM 821 informs the processor which has made a later request of whether or not the socket ID which has already been used in the other processors is usable, through the transmission result register 823 or the reception result register 825.

In case where only one processor makes a request or in case where two processors make requests but socket IDs are different from each other, the locking register FSM 821 informs each processor of whether or not socket IDs are usable through the transmission result register 823 or the reception result register 825.

The TCP transmission processor 100 or the TCP reception processor 200 checks whether or not a relevant socket is usable by checking the transmission result register 823 or the reception result register 825.

Figure 8:
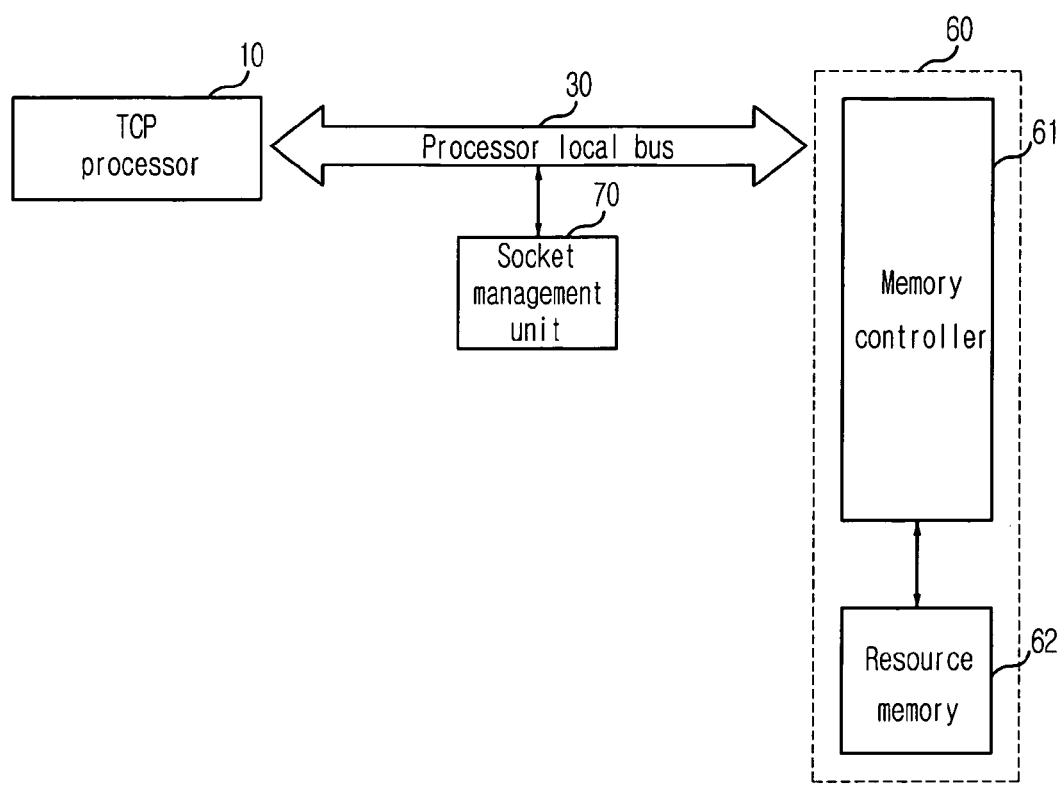
FIG. 8 illustrates a hardware device for creation and management of a socket in accordance with another embodiment of the present invention in an entire hardware device of TOE for acceleration of a protocol.

FIG. 8 illustrates a hardware device for creation and management of a socket in accordance with another embodiment of the present invention in an entire hardware device of TOE for acceleration of a protocol.

The hardware device shown in FIG. 8 has a structure in which a TCP protocol is processed using a single processor rather than a transmission processor and a reception processor which are separated from each other.

Referring to FIG. 8, the hardware device includes a TCP processor 10 for receiving a request for creation and elimination of a socket of a predetermined network program, processing a command for creation and elimination of a socket, and generating a search signal for a relevant socket ID upon receipt of a new packet, a socket management unit 70 for creating and eliminating a socket ID in accordance with a command from the TCP processor, searching a socket ID in accordance with a command from the TCP processor, and providing the searched socket ID to the TCP processor, and a memory unit 60 for storing socket information and providing the socket information to the TCP processor. Differently from the hardware device shown in FIG. 1, the above-described hardware device using a single processor has advantages in that a locking management unit for controlling a simultaneous access to the same sockets of a transmission processor and a reception processor is not necessary.

As shown in FIG. 8, the socket management unit 70 is connected to the TCP processor 10 and the memory unit 60 via a processor local bus 30 in case where a single TCP processor is used.

The memory unit 60 includes a resource memory 62 and a memory controller 61, and has a same configuration as that of the memory unit 600 shown in FIG. 1.

Figure 9:
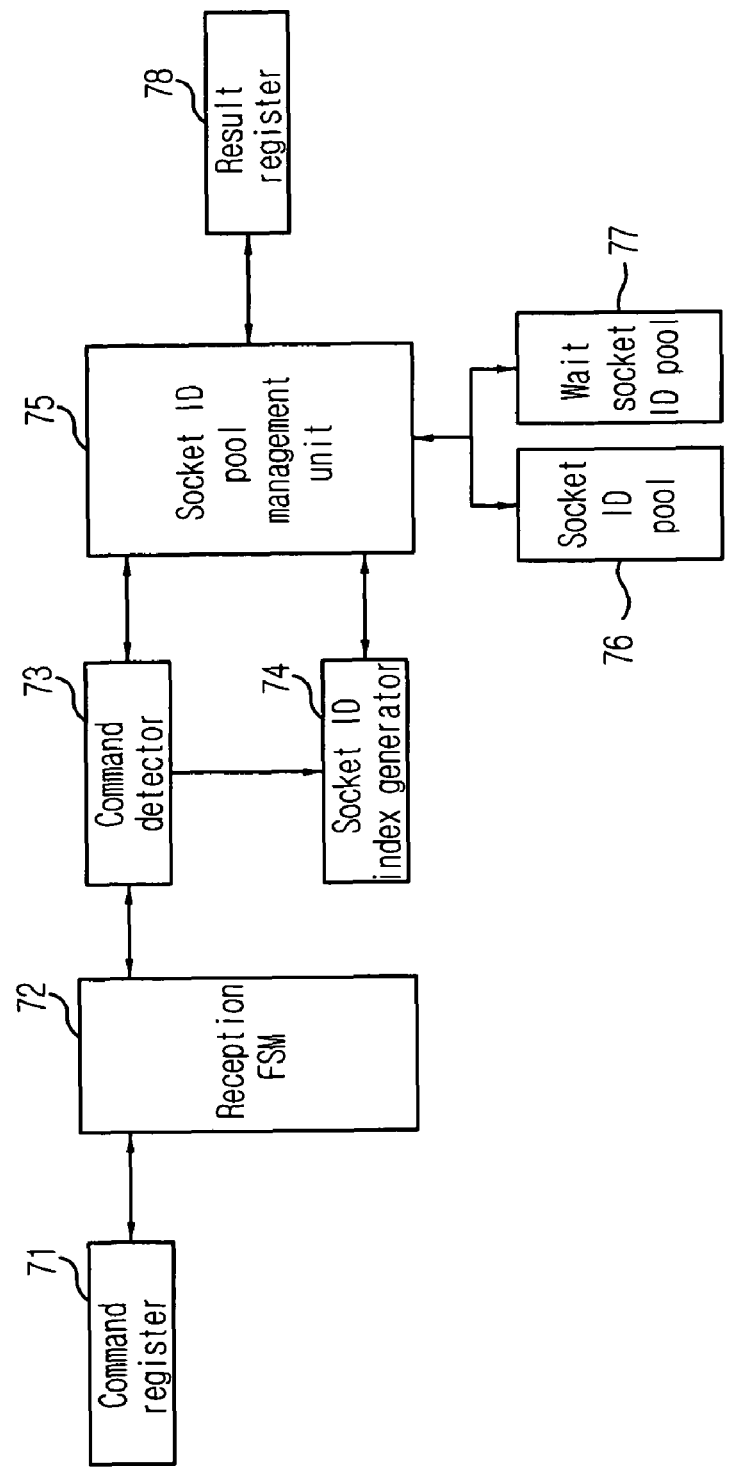
FIG. 9 is a detailed block diagram of the socket management unit depicted in FIG. 8.

FIG. 9 illustrates a detailed block diagram of the socket management unit 70 depicted in FIG. 8.

Referring to FIG. 9, the socket management unit 70 includes a command register 71 for receiving a predetermined command from the TCP processor 10, a command judging block including a reception FSM 72, a command detector 73 and a socket ID index generator 74, for judging content of the command received at the command register 71, a socket ID management block including a socket ID pool management unit 75, a socket ID pool 76 and a wait socket ID pool 77, for storing at least one of a socket ID, a destination IP address, a source port, and a destination port, and managing the socket ID in accordance with a command from the command detector 73, and a result register 78 connected to the TCP processor 10 for storing the process result of the socket ID management block.

The command judging block has a configuration and a function same as those of the command judging unit 730 shown in FIG. 2. The socket ID management block has a configuration and a function same as those of the socket ID management unit 750 shown in FIG. 2.

Referring to FIGS. 8 and 9, in case where a single TCP processor is used, a separate locking management unit for controlling a simultaneous access to the same socket is not necessary since the single TCP processor controls creation, management and search of a socket. Moreover, only one command register and only one register are required for creation, management and search of a socket.

As described above, the present invention can make it possible to effectively conduct a creation and a management of a socket through the use of an exclusive hardware device, in case where TCP acceleration hardware is designed or manufactured in such a manner that two built-in processors perform transmitting/receiving functions independently from each other.

Using this exclusive hardware device, increase in system loads caused due to an increase in the creation and management of a socket by a server processor and a client processor in a system can be prevented. As a consequence, the degradation of system performance caused due to an increase in the creation and management of a socket can be prevented.

The present application contains subject matter related to Korean patent application Nos. 2004-0102909 and 2005-90066, filed with the Korean Intellectual Property Office on Dec. 8, 2004 and Sep. 27, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A hardware device for creation and management of socket information, the hardware device comprising:
   a Transmission Control Protocol (TCP) transmission processor for processing commands on requests for creation and elimination of a socket of a predetermined network program in response to the requests for creation and elimination of a socket;
   a TCP reception processor that issues a search command signal for a corresponding socket identification (ID) when a new packet is received;
   a socket management unit for creating and eliminating a socket ID in accordance with a command from the TCP transmission processor, and searching the socket ID, creating a socket ID search success mark, and storing the socket ID search success mark and the searched socket ID in a register with the search command from the TCP reception processor; and
   a memory unit for storing the socket information under the control of the TCP transmission processor, and providing the socket information to the TCP reception processor wherein the TCP reception processor reads the searched socket ID from the register and calculates, using the searched socket ID, a region of the memory unit that stores the socket information.

2. The hardware device as recited in claim 1, wherein the socket management unit is connected to the TCP transmission processor via a transmission processor local bus and connected to the TCP reception processor via a reception processor local bus.

3. The hardware device as recited in claim 1, wherein the memory unit is connected to the TCP transmission processor and the socket management unit through the transmission processor local bus and connected to the TCP reception processor and the socket management unit through the reception processor local bus.

4. The hardware device as recited in claim 1, further comprising a locking management unit for controlling a simultaneous access of the TCP transmission processor and the TCP reception processor to a same socket.

5. The hardware device as recited in claim 4, wherein the locking management unit is connected to the TCP transmission processor through the transmission processor local bus and connected to the TCP reception processor through the reception processor local bus.

6. The hardware device as recited in claim 4, wherein the locking management unit includes:
   a socket ID comparing section for receiving socket IDs to be used in the TCP transmission processor and the TCP reception processor, and comparing the socket IDs; and a simultaneous connection control section for informing the TCP transmission processor and the TCP reception processor of whether or not the use of one of processors has been finished if the compared socket IDs are the same, and informing the TCP transmission processor and the TCP reception processor of where or not the socket IDs are usable if the compared socket IDs are not the same.

7. The hardware device as recited in claim 6, wherein the socket ID comparing section includes:
a transmission command register for receiving and storing a socket ID to be used in the TCP transmission processor;
a reception command register for receiving and storing a socket ID to be used in the TCP reception processor; and
a comparator for judging whether or not the socket ID stored in the transmission command register and the socket 113 stored in the reception command register are the same.

8. The hardware device as recited in claim 7, wherein the simultaneous connection control section includes:
a locking register Finite State Machine (FSM) for judging whether or not the use of one of processors has been finished if the comparison result at the comparator indicates that the socket IDs are the same, and judging whether the socket IDs are usable if the socket IDs are not the same;
a transmission result register for storing information on whether or not a socket ID to be used in the TCP transmission processor is usable, in accordance with the judgment of the locking register FSM; and
a reception result register for storing information on whether or not a socket ID to be used in the TCP reception processor is usable, in accordance with the judgment of the locking register FSM.

9. The hardware device as recited in claim 1, wherein if a socket creation command is received from the TCP transmission processor, the socket management unit creates a new socket ID with reference to a stored existing socket ID, and creates a socket ID creation success mark.

10. The hardware device as recited in claim 9, wherein TCP transmission processor checks the socket ID creation success mark of the socket management unit, calculates an address to be stored in the memory unit by using the created new socket ID, and stores socket information in a corresponding region.

11. The hardware device as recited in claim 1, wherein if a socket elimination command is received from the TCP transmission processor, the socket management unit eliminates a corresponding socket ID from the stored socket IDs, and creates a socket ID elimination success mark.

12. The hardware device as recited in claim 1, wherein in case where the TCP transmission processor waits for a connection request from an external system, the TCP transmission processor transmits a wait command of a socket to the socket management unit, and the socket management unit stores a corresponding socket ID and a source port, and creates a wait command success mark.

13. The hardware device as recited in claim 1, wherein if a connection request is received from an external system after the creation of a socket, the TCP transmission processor transmits a socket information completion command to the socket management unit, and the socket management unit stores the corresponding socket information and creates a socket information completion command success mark.

14. The hardware device as recited in claim 1, wherein if a new packet is received from an external system, the TCP reception processor transmits a socket ID search command to the socket management unit, and the socket management unit creates an index for search of a socket ID, searches a corresponding socket ID by using the index, and creates a socket ID search command success mark.

15. The hardware device as recited in claim 14, wherein the TCP reception processor checks the socket ID search command success mark of the socket management unit, and acquires socket information from the memory unit by using the searched socket ID.

16. The hardware device as recited in claim 1, wherein the socket management unit includes:
a transmission command register for receiving a predetermined command from the TCP transmission processor;
a reception command register for receiving a predetermined command from the TCP reception processor;
a command judging unit for checking the commands received at the transmission command register and the reception command register, and judging the contents of the commands;
a socket ID management unit for storing at least one of a socket ID, a destination Internet Protocol (IP) address, a source port, and a destination port, and managing the socket ID in accordance with the command judged by the command judging unit; a transmission result register connected to the TCP transmission processor for storing the process result of the socket ID management unit; and
a reception result register connected to the TCP reception processor for storing the process result of the socket ID management unit.

17. The hardware device as recited in claim 16, wherein the socket ID management unit includes:
a socket ID pool for storing information on a socket ID, a destination IP address, a source port, and a destination port;
a wait socket ID pool for storing a socket ID of a corresponding socket and a source port in a case where a wait request is sent from an external system; and a socket ID pool management unit for controlling the socket ID pool or the wait socket ID pool in accordance with the command judged by the command judging unit.

18. A method for creation and management of socket information in a TCP acceleration hardware device having a TCP transmission processor and a TCP reception processor, the method comprising the steps of: in response to a socket creation command received from the TCP transmission processor, creating a new socket ID with reference to a stored existing socket ID, creating a socket ID creation success mark, and storing the socket ID creation success mark and the new socket ID in a register;
allowing the TCP transmission processor to check the socket ID creation success mark and the new socket ID in the register and to calculate a region to be stored in a predetermined memory by using the new socket ID; and
permitting the TCP transmission processor to store socket information in the calculated region of the memory.

19. A hardware device for creation and management of socket information, the hardware device comprising:
a TCP processor for processing commands on requests for creation and elimination of a socket of a predetermined network program in response to the requests for creation and elimination of a socket, and generating a search signal for a corresponding socket ID upon reception of a new packet;
a socket management unit for creating and eliminating a socket ID in accordance with a command from the TCP processor, searching a socket ID in accordance with a command from the TCP processor, creating a socket ID search success mark, and storing the socket ID search success mark and the searched socket ID in a register; and a memory unit for storing socket information and providing the socket information to the TCP processor under the control of the TCP processor, wherein the TCP processor reads the searched socket ID from the register and calculates, using the searched socket ID, a region of the memory that stores the socket information.

20. The hardware device as recited in claim 19, wherein in case where the TCP transmission processor waits for a connection request from an external system, the TCP processor transmits a wait command of a socket to the socket management unit, and the socket management unit stores a corresponding socket ID and a source port, and creates a wait command success mark.

21. The hardware device as recited in claim 19, wherein if a socket elimination command is received from the TCP processor, the socket management unit eliminates a corresponding socket ID from the stored socket IDs and creates a socket ID elimination success mark.

22. The hardware device as recited in claim 19, wherein if a connection request is received from an external system after the creation of a socket, the TCP processor transmits a socket information completion command to the socket management unit, and the socket management unit stores socket information and creates a socket information completion command success mark.

23. The hardware device as recited in claim 19, wherein if a new packet is received from an external system, the TCP processor transmits a socket ID search command to the socket management unit, and the socket management unit creates an index for search of a socket ID, searches a corresponding socket II) by using the index, and creates a socket ID search command success mark.

24. The hardware device as recited in claim 19, wherein the TCP processor checks the socket ID search command success mark of the socket management unit, and acquires socket information from the memory unit by using the searched socket ID.

* * * * *